US012518179B2

(12) United States Patent
Doan Huu

(10) Patent No.: US 12,518,179 B2
(45) Date of Patent: Jan. 6, 2026

(54) TIME-SERIES FORECASTING BASED ON DETECTED DOWNTIME

(71) Applicant: Business Objects Software Ltd., Dublin (IE)

(72) Inventor: Jacques Doan Huu, Montigny le Bretonneux (FR)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 930 days.

(21) Appl. No.: 17/726,712

(22) Filed: Apr. 22, 2022

(65) Prior Publication Data

US 2023/0342632 A1 Oct. 26, 2023

(51) Int. Cl.
*G06N 3/082* (2023.01)
*G05B 19/4065* (2006.01)
*G06N 3/088* (2023.01)
*G06N 5/022* (2023.01)
*G06N 5/047* (2023.01)

(52) U.S. Cl.
CPC ............ *G06N 5/022* (2013.01); *G06N 5/047* (2013.01)

(58) Field of Classification Search
USPC ......... 382/141–159; 705/7.11–7.38; 706/900–906, 1–62; 714/1–47.3
See application file for complete search history.

(56) References Cited

U.S. PATENT DOCUMENTS

| 10,776,100 | B1* | 9/2020 | Hoprich | G06F 8/65 |
| 2020/0143499 | A1* | 5/2020 | Erdem | G06N 5/01 |
| 2020/0325766 | A1* | 10/2020 | Gupta | E21B 47/008 |
| 2022/0024607 | A1* | 1/2022 | Leitch | B64F 5/60 |
| 2022/0190940 | A1* | 6/2022 | Zaifman | H04B 17/26 |
| 2023/0177443 | A1* | 6/2023 | Senderovich | G06Q 10/04 705/348 |

* cited by examiner

Primary Examiner — Marcellus J Augustin
(74) Attorney, Agent, or Firm — Buckley, Maschoff & Talwalkar LLC

(57) ABSTRACT

Provided is a system and method which generates a composite machine learning model that can filter downtime data from a time-series data signal and perform a prediction on remaining time-series data. In one example, the method may include detecting a pattern of downtime data within a time-series data signal, removing a subset of data from the time-series data based on the detected pattern of downtime and building a machine learning model to make predictions based on remaining data in the time-series data, generating segregation instructions configured to remove downtime data from a time-series data signal of a same type and to predict zero on future dates matching the downtime segregation codes, and building a composite machine learning model that includes the trained machine learning model and the segregation instructions for filtering data that is input to the trained machine learning models.

18 Claims, 9 Drawing Sheets

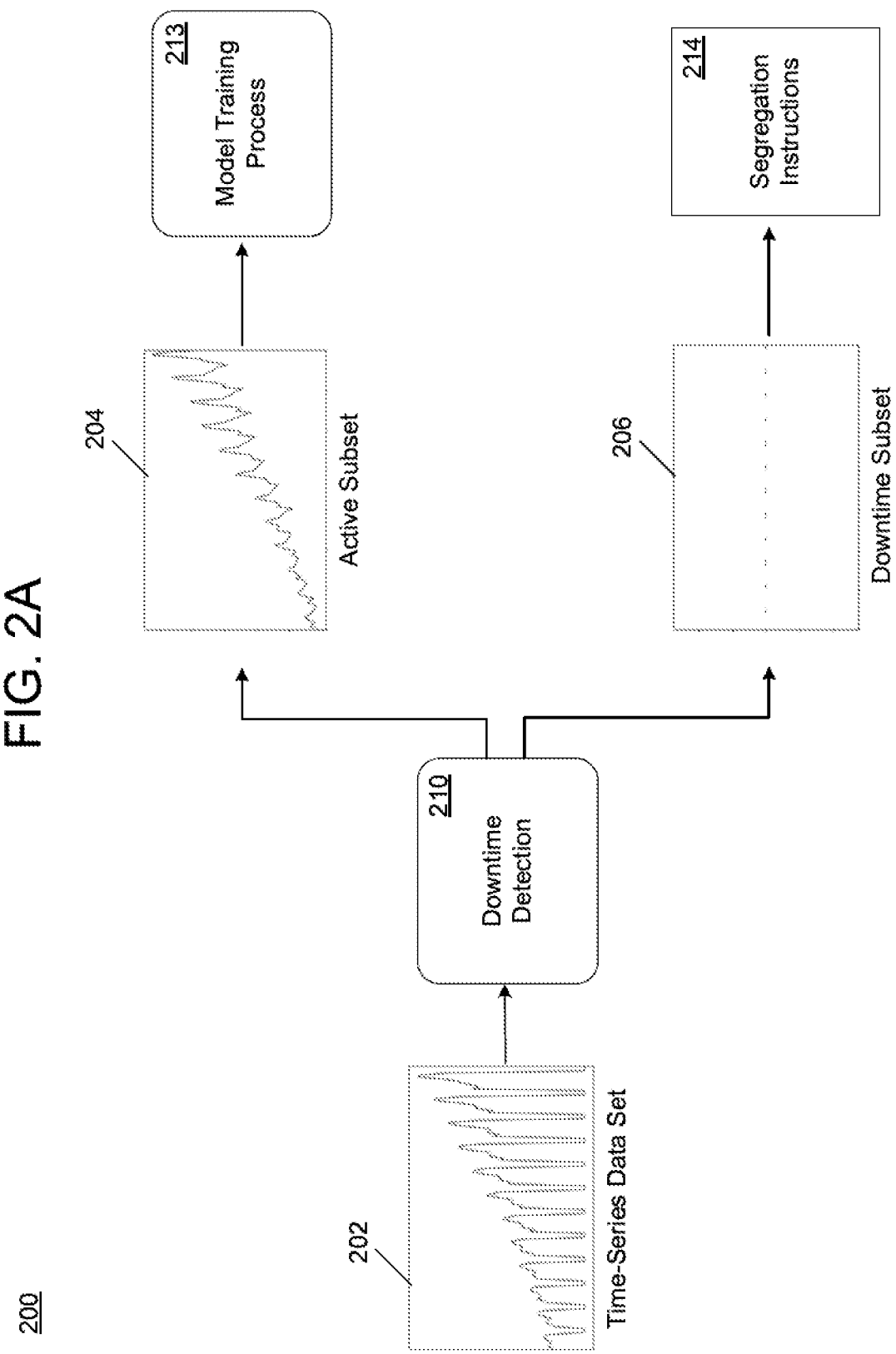

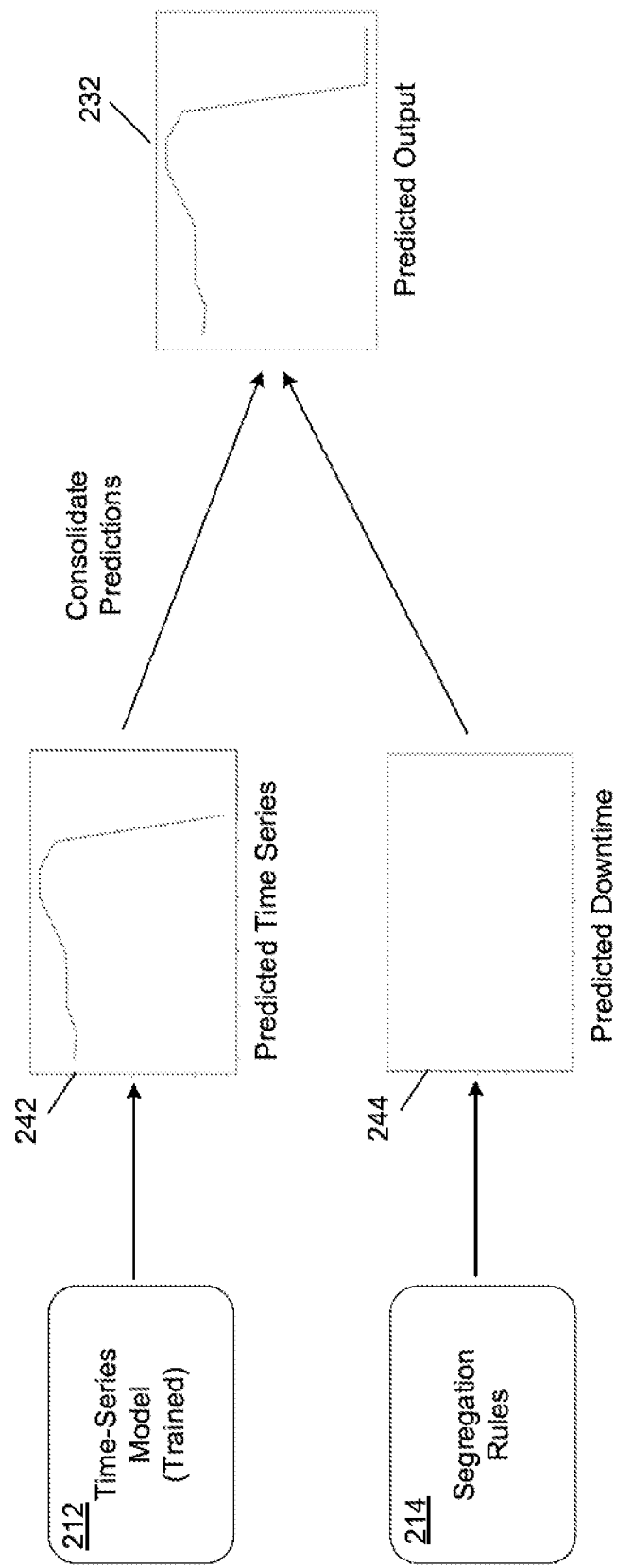

TIME-SERIES FORECASTING BASED ON DETECTED DOWNTIME

BACKGROUND

Time-series data contains sequential data points (e.g., data values) that can be observed at successive time durations (e.g., hourly, daily, weekly, monthly, annually, etc.). For example, monthly rainfall, daily stock prices, annual sales revenue, etc., are examples of time-series data. Sensors in combination with machine learning can be used to analyze the time-series data and make predictions. For example, time-series forecasting (or more simply "forecasting") is a machine learning process which can be used to learn from historical values of time-series data and predict future values of the time-series data based on the learning. As an example, a forecasting process may output a graph of time-series data as a plurality of data points over time (linear) that are displayed on a user interface for an analyst or other user to visualize and possibly take actions according to the prediction.

For many reasons, time-series data may be intermittent. That is, the value of the time-series signal may be zero due to an interruption or a planned downtime. For example, a business may close every Monday for re-stocking and ordering. For purposes of training a time-series based machine learning model, the downtime (or zero's) can cause the performance of the machine learning model to suffer. In particular, downtime can cause the model to exhibit bias or be less accurate than if the downtime data had been removed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is a diagram illustrating a process of generating segregation rules based on recurring downtime within a time-series data set in accordance with an example embodiment.

FIG. 2C is a diagram illustrating a process of generating a predicted time-series data signal based on the composite model of FIG. 2B, in accordance with an example embodiment

Figure 1:
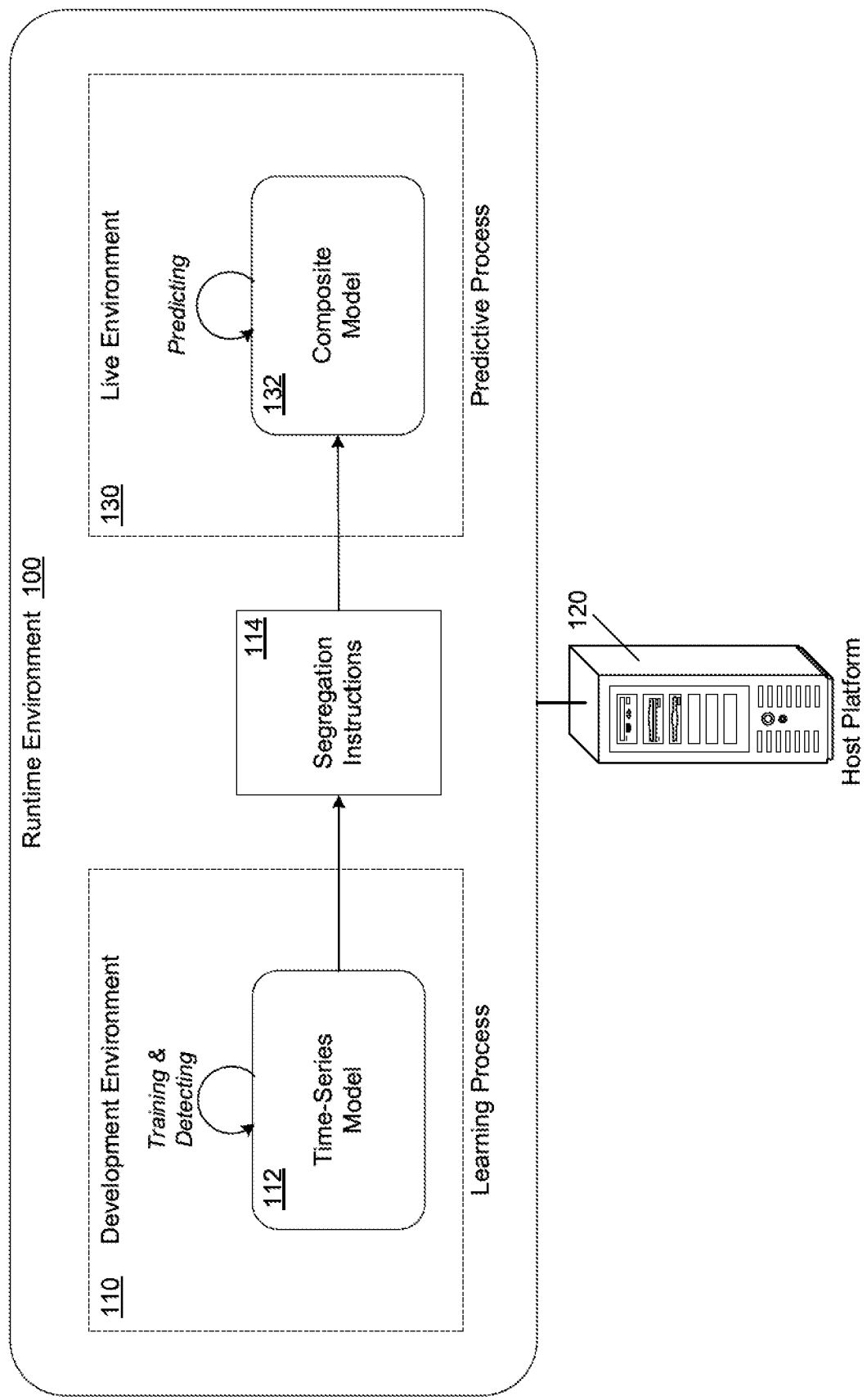
FIG. 1 is a diagram illustrating an architecture of host platform which includes a test environment and a productive environment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Time-series forecasting models are machine learning models that are used to predict a single set of values of an item (e.g., cost, quantity, amount, intensity, etc.) recorded over equal time increments (e.g., minutes, days, hours, weeks, years, etc.) The models may represent data attributes that are frequently found in business applications such as trends, seasonality, fluctuations, residuals, and time dependence. Model features may be trained based on available historical data. The trained model can then be used to forecast future values for the data. Some examples of time-series forecasting models include exponential smoothing (ETS) and autoregressive integrated moving average (ARIMA) just to name a few.

Most time-series forecasting models are univariate and attempt to learn a dynamically changing time-series signal over time. To train the model, a series of simulations of the model (machine learning algorithm) are executed on training data (historically measured data values). The result is a model that can predict the normal output of the data pattern in the future. However, time-series data can be "intermittent" in that there are periods of activity or fluctuating data points and there are periods of downtime which do not provide data points with non-empty value. Downtime or "data downtime" refers to periods of time when data is zero, missing, or otherwise inaccurate or erroneous. These null or empty values can reduce the accuracy of the underlying machine learning model. For example, the downtime values (or zero values) may be considered during model training (e.g., may be inputs, etc.) and may cause the model to exhibit bias. Some recent attempts to address downtime within a time-series data set include using Croston's method to identify "random" downtime patterns in a stochastic fashion. The Croston's method is a forecast strategy for products with intermittent demand. When using the method, separate exponential smoothing estimates are made of the average size of a demand. Second, the average interval between demands is calculated. This is then used in a form of the constant model to predict the future demand. But these attempts fail to address planned or recurring (e.g., seasonal) downtime. Instead, Croston's method is designed to identify intermittent periods of demand within a larger interval and not recurring demands on a recurring interval.

The example embodiments provide a novel process by which regular downtime within the time-series data (e.g., recurring downtime, seasonal downtime, etc.) which may be identified during a development phase of a time-series machine learning model. Here, the downtime may refer to a business entity such as a store, a person, a thing, or the like, which is not open, active, or otherwise creating non-empty value data points. The identified downtime may be converted into segregation rules (computer instructions) which may be encoded within the time-series machine learning model or may be embodied in a separate software program. The segregation rules may initially be used during the training process to remove all downtime data from the training data set and train the model on only the non-downtime data.

In addition, the segregation rules can be transferred to the live environment (productive environment) along with the time-series machine learning model where the segregation rules can be used in conjunction with the model when making predictions on new data. For example, in the live environment, the host platform may receive a new time-series data set with a request to execute the trained time-series machine learning model on the new data. Here, the host platform may filter the new time-series data set to remove downtime data based on the segregation rules that were previously created during the training phase. The filtered data may be removed from the process and may not be input/entered into the time-series forecasting model. Instead, only the remaining time-series data may be input to the time-series machine learning model.

If the downtime is not removed, the extracted data patterns will be a weighted compromise between a flat zero process (downtime) and a fluctuating regular process (active or uptime) which results in a model that exhibits bias (e.g., underestimate the value due to the null or downtime values, etc.) To prevent this, the example embodiments identify the periods of downtime during a training phase and build instructions for segregating the data in the live environment during a predicting phase. The segregation instructions tend to ignore random and infrequent downtime sub-periods and focus on the regular (seasonal) or recurring periods of downtime. As a result, the live data may be segregated into two subsets including a fluctuating subset of data and a downtime period of data based on the segregation instructions. Furthermore, only the live data may be input to the time-series machine learning model rather than both the live data and the downtime data. The result is a more accurate prediction due to the lack of bias that results from removing the downtime data. Moreover, downtime segregation instructions enable to identify downtime sub periods on the future dates. The predictive system can then enforce zero value as prediction for such sub periods on future predictions. Without this segregation process to separate downtime sub periods and regular fluctuating sub periods, the downtime ignorant trained model would in general predict unexpectedly a non-zero value on downtime sub periods where no activities were observed consistently on the past.

In the learning phase, the host platform may detect a downtime pattern within a training data set or sets. For example, the host platform may analyze the data set using multiple different sub-process/sub-threads which execute algorithms based on different granularities of time (e.g., days, weeks, months, quarters, etc.) Here, the different sub-processes may query the data set differently based on the different time ranges/granularities. The queries may be performed using any data query language such as structure query language (SQL), NoSQL, or any other desired query language.

If no downtime pattern is found, the process may proceed and perform modeling on the whole data set. However, if a regular downtime pattern or patterns are detected, the host platform may use these patterns to remove the downtime data during the training phase and only train the model using the uptime data.

Furthermore, the host platform may generate segregation rules that are encoded into a software program (such as the machine learning model or a separate program that is called by the machine learning model) that can be used to cut or otherwise remove data from model processing in the live environment. The final composite model includes a trained time-series forecasting model based on fluctuating time-series data and a downtime period identification rule or rules based on downtime detected from the data (or provided by a user from a user interface).

Both the trained model and the downtime identification and segregation rules may be transferred to the live environment when the model is instantiated/deployed. When new data is provided to the model in the live environment, the host platform may apply the downtime pattern/rule within the segregation instructions to separate the contiguous series into downtime subperiods with zero as a signal value and fluctuating subperiods where the value of the time-series data is changing. Both subperiods are time discontinuous. Furthermore, the host platform may perform predicting on fluctuating sub series only and remove the downtime data (if there is any) from consideration by the model.

FIG. 1 illustrates a runtime environment 100 of a host platform 120 which includes a development environment 110 and a live/productive environment 130 in accordance with an example embodiment. Referring to FIG. 1, the host platform 120 may be a web server, a cloud platform, a personal computer, or the like, which hosts the development environment 110 for building machine learning models, such as an Integrated Development Environment (IDE). In the example of FIG. 1, a machine learning model 112 is being developed/trained within the development environment 110. The process may include a training data set or sets (not shown) being input or otherwise uploaded to the host platform 120. In response, the host platform 120 may analyze the training data sets and identify periods of recurring downtime (seasonal downtime) that occurs within the time-series data on a recurring and regular basis within the time-series data set. That is, the host platform 120 may avoid random or spurious occurrences of downtime and instead focus on finding patterns of downtime that occur more than a predetermined ratio of time (e.g., more than 75%, 90%, etc.)

The host platform 120 may look for columns, rows, cells, etc. within the time-series data that are null or zero value. The host platform 120 may accumulate the number of occurrences of the null or zero value over time (e.g., within the last year, 5 years, 10 years, etc.) to identify patterns of downtime that occur each year, each month, each week, etc. The host platform 120 may use separate threads/sub-processes for analyzing the different granularities. For example, one sub-process may be dedicated to finding daily granularity downtime (days in the week) while another sub-process may be dedicated to finding monthly granularity downtime (months in the year). When a period of time falls within multiple granularities, the broader or more simple granularity may be chosen to represent the time period.

The host platform 120 may generate segregation instructions 114 (encoded computer instructions) that can be added or otherwise associated with the machine learning model 112. The host platform 120 may then segregate the training data (analyzed time-series data set) into two subsets including a subset of active/fluctuating time-series data and a subset of downtime data based on the segregation instructions 114 (i.e., based on the detected patterns of downtime within the training data). The host platform 120 may remove the downtime data from the time-series data set and train the machine learning model 112 on the active/fluctuating time-series data subset instead of both subsets of data. The trained machine learning model can be combined with segregation instructions 114 (computer code) to create a composite model 132 that includes both the machine learning model 112 that has been trained and the segregation instructions 114.

Furthermore, the host platform 120 may deploy the composite model 132 within the live environment 130 that is accessible to external or remote devices from the host platform 120 via the Internet/web. When deployed within the live environment 130, the composite model 132 may filter incoming data based on the segregation instructions 114 and predict an output with the machine learning model 112 based on the filtered time-series data. In this example, the live environment 130 may also be hosted by the host platform 120. Another possible embodiment is that the live environment 130 and/or the development environment 110 are hosted by different system/providers and are accessible via network communications.

FIG. 2A illustrates a process 200 of generating segregation instructions based on recurring downtime within a time-series data set in accordance with an example embodiment. Referring to FIG. 2A, the host platform may execute a downtime detection program 210 such as a software thread or program that identifies downtime within a time-series data set 202. For example, the time-series data set 202 may be provided by a developer of a time-series machine learning model for use in training the model. Here, the downtime detection program 210 may detect recurring downtime patterns. If no downtime pattern is found, the host platform may proceed with modeling on the entirety of the time-series data set 202.

However, if a recurring pattern of downtime is detected, the downtime detection program 210 may separate the fluctuating time-series data from the downtime time-series data (zero as a signal value) and store each pattern of data in different subsets of data including an active subset 204 and a downtime subset 206, respectively. For example, the subsets may be stored in files such as XML, JSON, documents, database tables, etc. The active subset 204 may be transferred to a model training process 213 for training a machine learning model (e.g., a time-series forecasting model, etc.) based on the active subset 204. Meanwhile, the downtime subset 206 may be used to generate segregation instructions 214, as further described in the examples of FIGS. 3A-3B.

As an example, the downtime detection program 210 may be embodied as a service that is hosted by the host platform 120 and that can be called by other programs/machine learning models (e.g., via an API, etc.). As another example, the downtime detection program 210 may be integrated within a development environment, such as an IDE where the model is being developed. The time-series data set 202 may include a combination of fluctuating time-series data (active subset 204) and downtime time-series data or zero-values (downtime subset 206) interspersed together with each other. The downtime detection program 210 may detect all intermittent occurrences of downtime data within the time-series data set 202 and add it to the downtime subset 206 and also remove it when creating the active subset 204. The host platform may analyze the occurrences of downtime in aggregate (from multiple months, years, etc.) to determine whether a recurring pattern of downtime exists within the intermittent occurrences of downtime. In some cases, the occurrences of the downtime may not be recurring but instead may be isolated or random.

However, if an occurrence of downtime is recurring, the downtime detection program 210 can generate a rule for segregating downtime data of the recurring downtime from future time-series data of a same type (i.e., another frame or table of time-series data being input into the same machine learning model) which may have a same or similar table format including column names, row names, etc. The host platform may then generate a composite model that includes both a combination of the trained machine learning model and the segregation instructions 214 for filtering incoming data before it is processed by the trained machine learning model. In some embodiments, the segregation instruction may identify a column by name or identifier as well as include a flag that indicates the column is not to be considered by the trained machine learning model. As another example, the identifier may include a flag that indicates a column is to be considered by the trained machine learning model. The flag may be added to a row or cell of the column of the time-series data set 202.

In addition, a user may also manually configure downtime instructions by entering periods of time (e.g., ranges of time via a calendar or other input field), entering column IDs, row IDs, table IDs, or the like, into a user interface output by the system and displayed on a user's device. The manually configured downtime instructions can be added to or otherwise used to modify or replace the automatically detected downtime rules. In addition, the segregation instructions 214 can also be applied to train the machine learning model as well. For example, the host platform may remove the downtime subset 206 from the training phase of the machine learning model and use only the active subset 204. Accordingly, the time-series model is initialized with non-downtime data points (filtering), The example embodiments improve a predictive accuracy of a time-series machine learning model by removing downtime data that can affect model bias using a novel "seasonal" downtime detection approach. In addition, the system can also create computer instructions and incorporate them into a composite model that also includes the trained machine learning model. The composite model can be deployed into a live operating environment and used to both filter incoming data and make predictions on the filtered data. Furthermore, the downtime can be used to provide insights on the identified downtime patterns via a user interface. The platform stops modeling dissimilar processes (downtime with constant zero and fluctuating sub series) and instead uses separate sub-processed to learn from only the fluctuating data and generate filter conditions (segregation instructions) based on the downtime data.

Figure 2B:
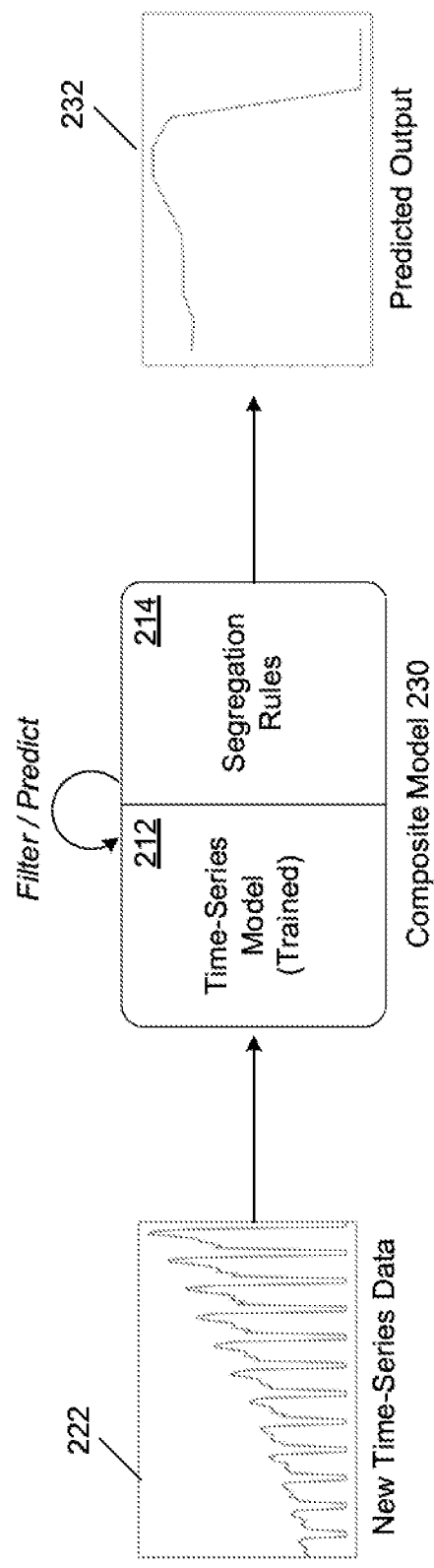
FIG. 2B is a diagram illustrating a process of incorporating the segregation instructions into a composite model in accordance with an example embodiment.

FIG. 2B illustrates a process 220 of incorporating the segregation instructions into a composite model 230 in accordance with an example embodiment. Referring to FIG. 2B, the host platform may launch or otherwise deploy an instance of a composite model 230 which includes both the time-series machine learning model 212 and segregation instructions 214 for filtering data that is input to the time-series machine learning model 212. In some embodiments, the segregation instructions 214 may be added or otherwise appended to the underlying source code of the time-series machine learning model 212. As another example, the segregation instructions 214 may call (e.g., via an API, etc.) another service or software program to filter the data according to the segregation instructions 214.

When new time-series data 222 is input to the composite model 230, the host platform may filter the new time-series data 222 based on the segregation instructions 214 to generate a filtered data set (not shown) based on the instructions in the segregation instructions 214. The filtered data set is then input into the time-series machine learning model 212 which generates a predicted output signal 232 on only the fluctuating data.

FIG. 2C illustrates a process 240 of generating a predicted time-series data signal based on the composite model of FIG. 2B, in accordance with an example embodiment. In some embodiments, the host platform may enforce a zero value in the predicted output signal 232 based on the expected downtime pattern identified within the new data based on the segregation instructions 214. In the example of FIG. 2C, the host may execute the time-series machine learning model 212 on new/live data to create a predicted output signal 242. Likewise, the host platform may execute the segregation instructions 214 on the new/live data to identify column within the data set (e.g., days in the future that are going to have downtime) that should be set to zero and output a zero-value enforcement signal 244. Then, the host platform may combine the predicted output signal 242 with the zero-value enforcement from the zero-value enforcement signal 244 to generate the predicted output signal 232. By enforcing a zero value within the new/live data for periods of time that are supposed to be downtime, erroneous data values stored within these periods will not be considered by the predictive model when making the prediction but instead will be enforced to zero.

As an example, the zero-value enforcement signal 244 may identify future data that is to be segregated. For example, the data that is to be segregated may be organized based on dates. Here, the segregation instructions may identify dates that are to be excluded from the predicted output signal 232. For example, the host may label columns or cells within the dataset of new data with an indicator such as a tag, flag, code, value, etc. to indicate the data is to be segregated. When the model generates the predicted output signal 232, the model may ignore columns or cells of data within the dataset which are labeled with the indicator.

Figure 3A:
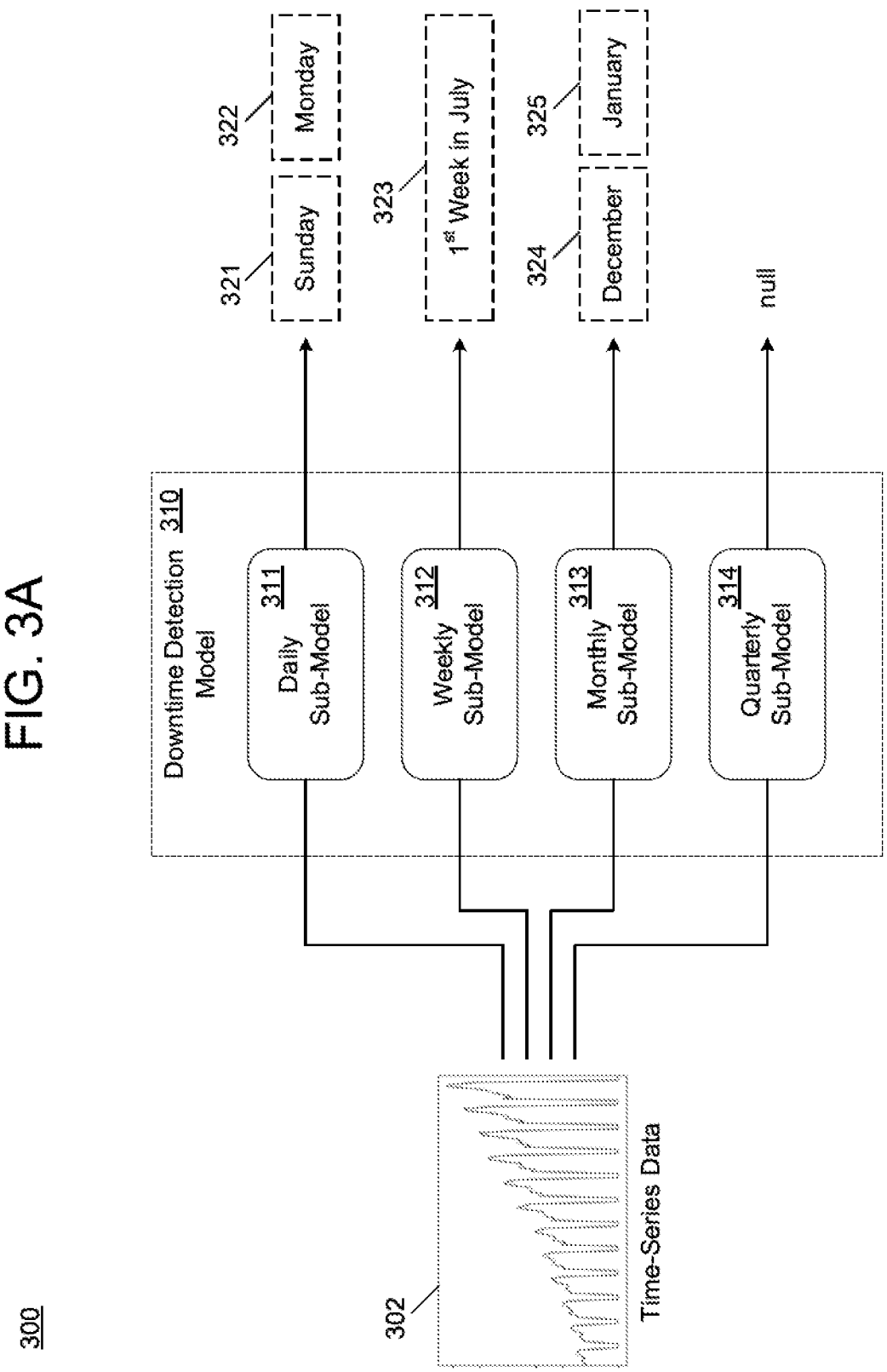
FIGS. 3A-3B are diagrams illustrating a process of converting downtime into segregation code in accordance with example embodiments.
Figure 3B:
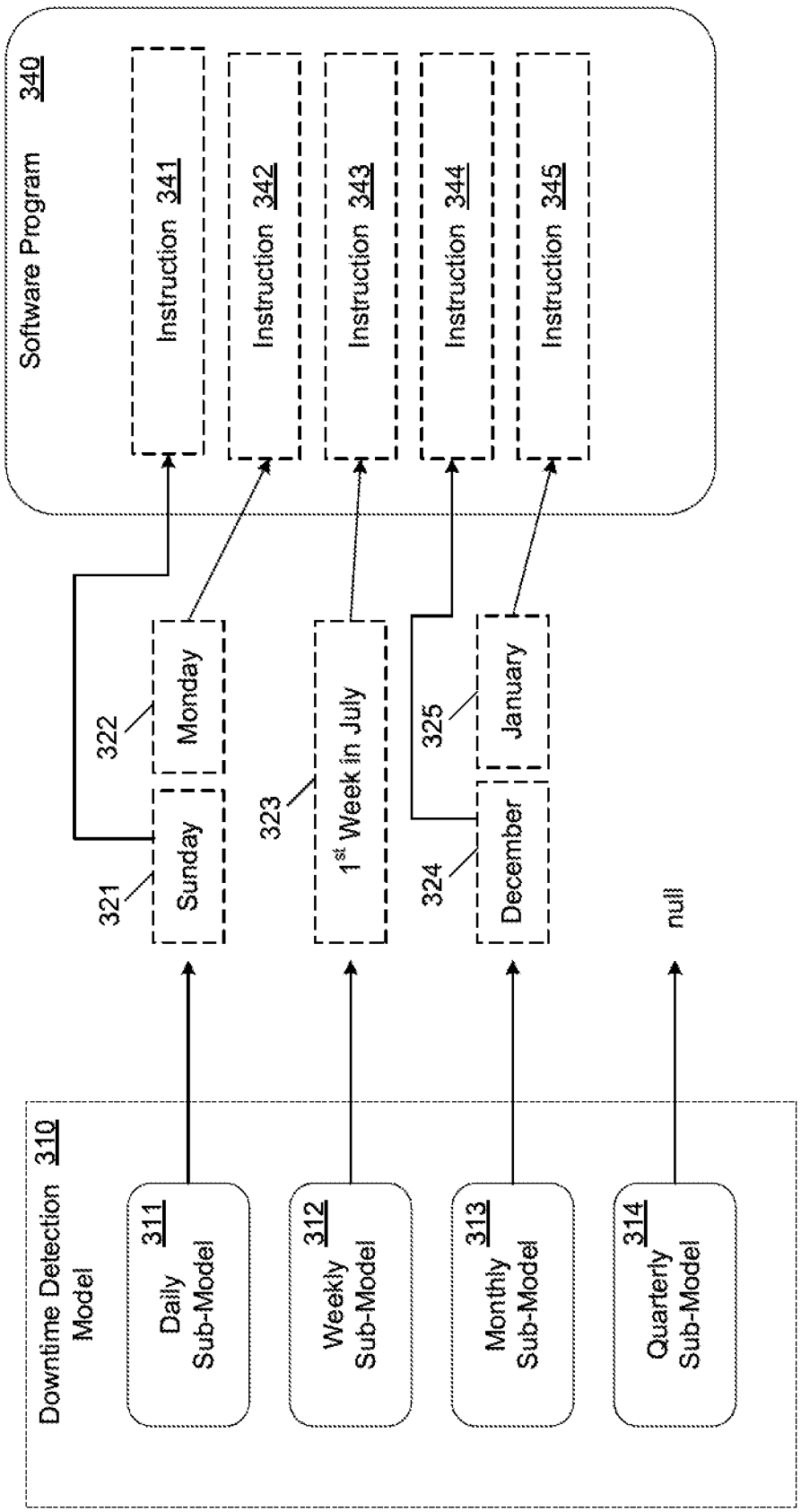

FIGS. 3A-3B illustrate a process of converting downtime into segregation instructions in accordance with example embodiments. According to various embodiments, the host platform described herein may host a downtime detection model 310 such as that shown in FIG. 3A. In particular, FIG. 3A illustrates a process 300 of identifying recurring downtime periods within a time-series data 302 such as that used to train a machine learning model. The downtime detection model 310 may be a statistical-based model. The time-series data 302 (e.g., a time-series data set, data signal, etc.) may be input to the downtime detection model 310. In response, the downtime detection model 310 may detect various periods of downtime that exist and that occur on a regular (e.g., seasonal, etc.) basis. Here, the downtime detection model 310 may query the time-series data 302, for example, based on SQL or some other query language, for data that can be accumulated and analyzed for recurring downtime. The host platform may create a temporary storage area or workspace of the software to use while it performs calculations and makes determinations.

In some embodiments, the downtime detection model 310 may query and analyze the time-series data 302 from different granularities (i.e., different periods of recurrence, etc.). For example, the downtime detection model 310 may include various sub-processes executed by a plurality of sub-models 311, 312, 313, and 314, which may query the time-series data 302 and analyze the time-series data 302 based on different time-period granularities (different recurring periods of time). Each sub-model 311, 312, 313, and 314, may be embodied as a separate processing thread or task within the host platform.

As an example, sub-model 311 may query and analyze time-series data for downtime that happens once a week (e.g., one day per week). Meanwhile, sub-model 312 may query and analyze time-series data for downtime that happens on a weekly basis, per year. Sub-model 313 can query and analyze time-series data to identify downtime that occurs on a monthly basis, per year, and sub-model 314 may query and analyze time-series data to identify downtime that occurs on a quarterly basis, per year. It should also be appreciated that different sub-models and granularities other than those shown may be used by the host platform.

In the example of FIG. 3A, the downtime detection model 310 outputs five periods of downtime 321, 322, 323, 324, and 325, which each may be encoded into segregation rules/filter conditions that can be incorporated within the machine learning model and used to auto-filter incoming data being fed to the machine learning model. In this example, the sub-model 311 detects that downtime occurs every Sunday and every Monday of each week. Meanwhile, the sub-model 312 detects that the $1^{st}$ full week in July is downtime every year. Furthermore, sub-model 313 detects that the months of December and January are also downtime each year. Each of these time periods may be integrated into software code and added to the machine learning model, for example, based on a script or other command that can control the filtering based on the segregation instructions.

FIG. 3B illustrates a process 330 of encoding the detected downtimes periods 321-325 into a plurality of instructions 341, 342, 343, 344, and 345 of a software program 340 that can be executed with the trained machine learning model to filter data that is input to the machine learning model. As an example, the software program 340 may be a script, a set of queries, a set of SQL commands, a combination thereof, and the like. Each downtime period may be converted into source code, for example, using predefined code-templates/modules with empty spaces to be filled-in with table names, column names, row names, etc.

Figure 4:
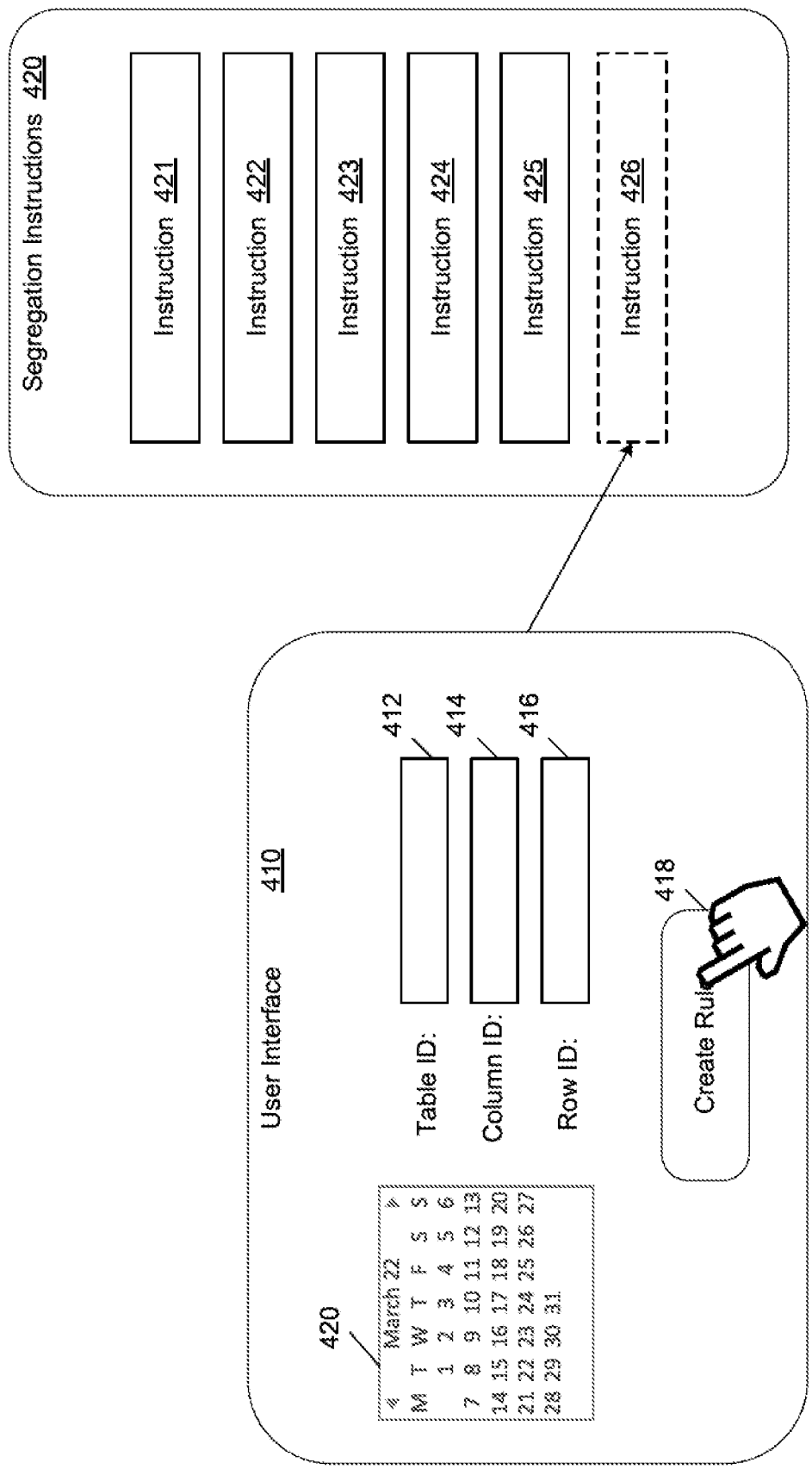
FIG. 4 is a diagram illustrating a process of a user configuring segregation rules in accordance with example embodiments.

FIG. 4 illustrates a process 400 of a user configuring segregation instructions via a user interface 410 in accordance with example embodiments. Referring to FIG. 4, the user/developer of the model may also enter in planned downtime that is known to the user. The planned downtime does not need to be recurring but can be any downtime that the user is aware of. Here, the user interface 410 may include a calendar 420 or other input mechanism for selecting a range of time, and other controls 412, 414, and 416 for entering specific table, row, and/or column information that is to be segregated, etc. The user may press a button 418, and in response, the host platform may convert the input values from input fields of the user interface 410 into an instruction 426 for filtering data that can be added to previously-generated instructions 421, 422, 423, 424, and 425 which were automatically created based on recurring patterns of downtime.

Figure 5:
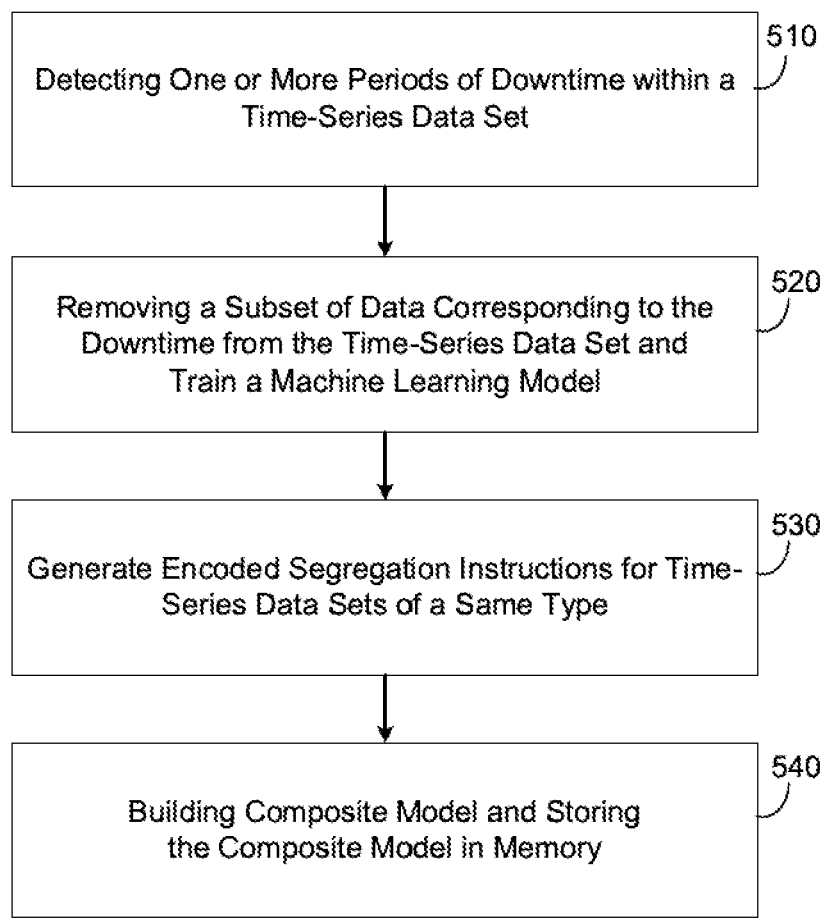
FIG. 5 is a diagram illustrating a method of generating segregation instructions for regular downtime in a time-series data set in accordance with an example embodiment.

FIG. 5 illustrates a method 500 of generating segregation instructions for regular downtime in a time-series data set in accordance with an example embodiment. For example, the method 500 may be executed by a cloud platform, a web server, a database node, a user device such as a mobile phone, tablet, laptop, personal computer, etc., a combination of devices/nodes, or the like. Referring to FIG. 5, in 510, the method may include detecting one or more patterns of downtime within a time-series data set based on null values within the time-series data set. For example, the system may identify cells, rows, columns, etc. within the data set that have zero values or empty/null values and consider these as possible downtime.

The downtime of interest is "recurring" downtime that happens on a regular basis such as every year, every month, every week, etc. The threshold for identifying whether or not the downtime is recurring downtime may be predefined or it may be dynamically set. For example, the system may require at least 75% of the instances of a particular time period to have the downtime present therein for it to be considered "recurring". As an example, a business may close every January due to the cold weather. In this case, the business may not have data values for time-series data during that particular time period such as sales, profits, costs, quantity, etc. Here, the system may determine whether or not the downtime is recurring based on the number of Januarys that have downtime over a predetermined period of time. For example, the system may consider the last 10 years and require at least 8 of the 10 years to have downtime in January. Also, different downtime granularities (hours, days, weeks, months, etc.) may be analyzed.

In 520, the method may include removing a subset of data from the time-series data set based on the one or more detected patterns of downtime and training a time-series machine learning model to make predictions based on a remaining subset of data from the time-series data set. In 530, the method may include generating encoded segregation instructions for removing data from a time-series data set of a same type. In 540, the method may include building a composite model that includes the trained time-series machine learning model and the encoded segregation instructions and storing the composite model in memory.

In some embodiments, the method may further include instantiating the trained machine learning model via a productive environment of a host platform and importing the encoded segregation instructions into the productive environment. In some embodiments, the method may further include executing the trained time-series machine learning model on new data and outputting a prediction based on the new data, wherein the executing comprises automatically removing a subset of the new data based on the encoded segregation instructions prior to execution of the trained time-series machine learning model.

In addition to automatically removing a subset of data from the new time-series data signal based on the segregation instructions prior to generating the prediction, the model may enforce a zero value for the subset of data in the output prediction. That is, the model may ensure that the periods of downtime that are identified from the downtime detection process do not contribute or affect the output prediction of the predicted output signal of the time-series data. As an example, for future dates which don't match a downtime segregation code, the data for those future dates may be considered in the predicted output. Conversely, for future dates matching a downtime segregation code, the model may enforce a predicted value of zero. This prevents erroneous data from being included in the training.

In some embodiments, the detecting may include applying a plurality of different seasonal granularity values when detecting a recurring pattern of downtime and selecting a granularity value from among the plurality of different granularity values to assign the recurring pattern of downtime. In some embodiments, the plurality of different granularity values comprise at least two of a daily value, a weekly value, a monthly value, and a quarterly value. In some embodiments, the generating may include generating a data segregation instruction based on a combination of a frequency of occurrence value of a recurring pattern of downtime and a time period value at which the recurring pattern of downtime occurs.

In some embodiments, the removing may include dividing the time-series data set into two subsets including a first subset with fluctuating time-series values and a second subset with null time-series values, and the training comprises training the machine learning model using the first subset but not the second subset. In some embodiments, the method may further include receiving planned downtime inputs via a user interface and generating additional segregation instructions for removing data from the future time-series data set of the same type based on the received planned downtime inputs.

Figure 6:
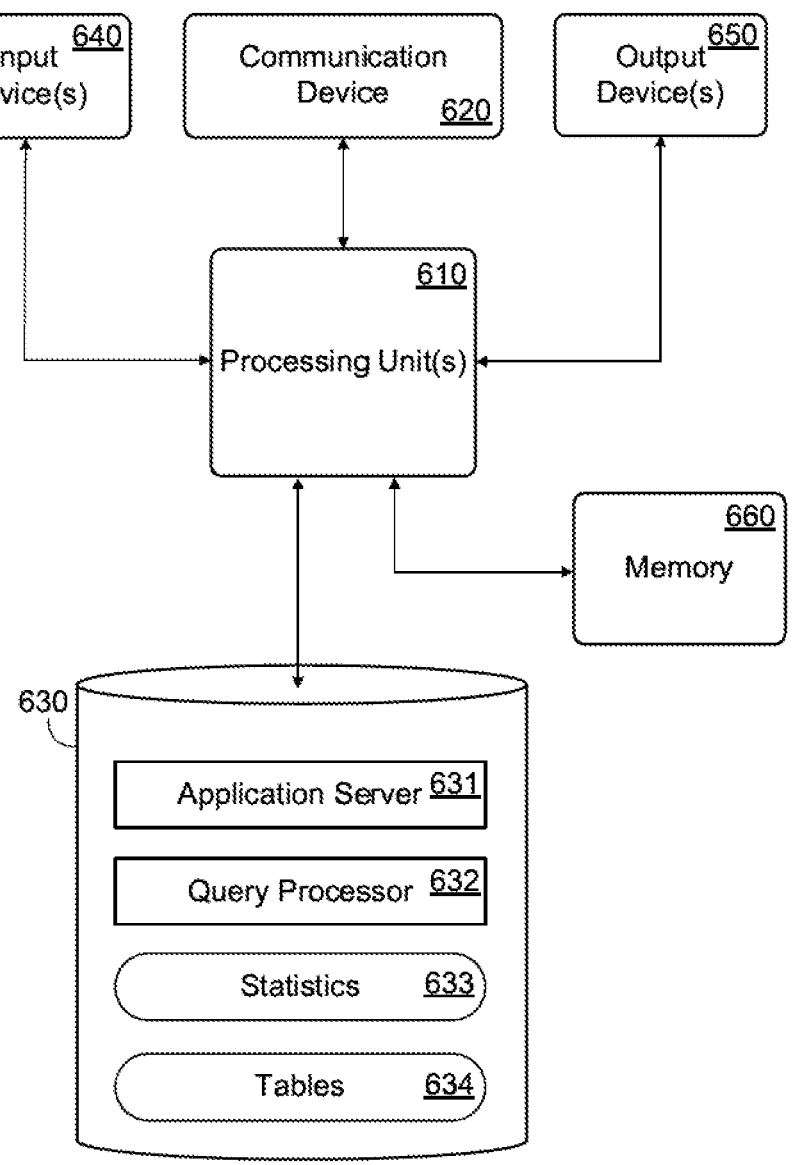
FIG. 6 is a diagram illustrating a computing system for use in the examples herein in accordance with an example embodiment.

FIG. 6 is a diagram of a server node 600 according to some embodiments. The server node 600 may include a general-purpose computing apparatus and may execute program code to perform any of the functions described herein including the process of building a composite model and deploying the composite model within a productive/live environment. In some embodiments, the server node 600 may comprise an implementation of a remote terminal or a host platform. It should also be appreciated that the server node 600 may include other elements according to some embodiments and may not include all of the elements shown in FIG. 6.

Server node 600 includes processing unit(s) 610 (i.e., processors) operatively coupled to communication device 620, data storage device 630, input device(s) 640, output device(s) 650, and memory 660. Communication device 620 may facilitate communication with external devices, such as an external network or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into the server node 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM). In some embodiments, the data storage device 630 may store user interface elements in tabular form. For example, one or more columns and one or more rows of user interface elements may be displayed in a two-dimensional spreadsheet, table, document, digital structure, or the like.

Application server 631 and query processor 632 may each comprise program code executed by processing unit(s) 610 to cause server node 600 to perform any one or more of the processes described herein. Such processes may include estimating selectivities of queries on tables 634 based on statistics 633. Embodiments are not limited to execution of these processes by a single computing device. Data storage device 630 may also store data and other program code for providing additional functionality and/or which are necessary for operation of server node 600, such as device drivers, operating system files, etc As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a memory configured to store time-series data of a time-series data signal; and
    a processor coupled to the memory and configured to:
    detect one or more patterns of downtime within the time-series data signal based on null values within the time-series data;
        remove a subset of data from the time-series data based on the one or more detected patterns of downtime;
        build a machine learning model to make predictions based on remaining data in the time-series data;
        generate segregation instructions configured to remove downtime data from a time-series data signal of a same type, the segregation instructions including encoded computer instructions to filter downtime data from time series data based on a combination of a frequency of occurrence value of a recurring pattern of downtime and a time period value at which the recurring pattern of downtime occurs;
        build a composite machine learning model that includes the machine learning model and the segregation instructions for filtering data that is input to the machine learning model; and
        store the composite model in the memory.

2. The computing system of claim 1, wherein the processor is further configured to deploy the composite model including the machine learning model and the segregation instructions within a productive environment.

3. The computing system of claim 1, wherein the processor is further configured to execute the machine learning model on new a new time-series data signal and output a prediction based on the new time-series data signal, wherein the processor automatically removes a subset of data from the new time-series data signal based on the segregation instructions prior to generating the prediction and enforces a zero value for the subset of data in the output prediction.

4. The computing system of claim 1, wherein the processor is configured to apply a plurality of different granularity values when detecting a pattern of downtime and select a granularity value from among the plurality of different granularity values to assign the pattern of downtime.

5. The computing system of claim 4, wherein the plurality of different granularity values comprise at least two of a daily value, a weekly value, a monthly value, and a quarterly value.

6. The computing system of claim 1, wherein the processor is configured to divide the time-series data signal into two subsets including a first subset with a fluctuating time-series signal value and a second subset with a null time-series signal value, and train the machine learning model using the first subset but not the second subset.

7. The computing system of claim 1, wherein the processor is further configured to receive downtime inputs via a user interface and generate additional segregation instructions for removing data from the time-series data signal of a same type based on the received downtime inputs.

8. A method comprising:
    detecting one or more patterns of downtime within a time-series data signal based on null values within values of time-series data corresponding to the time-series data signal;
    removing a subset of data from the time-series data based on the one or more detected patterns of downtime and building a machine learning model to make predictions based on remaining data in the time-series data;
    generating segregation instructions configured to remove downtime data from a time-series data signal of a same type, the segregation instructions including encoded computer instructions to filter downtime data from time series data based on a combination of a frequency of occurrence value of a recurring pattern of downtime and a time period value at which the recurring pattern of downtime occurs;
    building a composite machine learning model that includes the machine learning model and the segregation instructions for filtering data that is input to the machine learning model; and
    storing the composite model in memory.

9. The method of claim 8, wherein the method further comprises deploying the composite model including the machine learning model and the segregation instructions within a productive environment.

10. The method of claim 8, wherein the method further comprises executing the machine learning model on new a new time-series data signal and outputting a prediction based on the new time-series data signal, wherein the executing comprises automatically removing a subset of data from the new time-series data signal based on the segregation instructions prior to generating the prediction and enforcing a zero value for the subset of data in the output prediction.

11. The method of claim 8, wherein the detecting comprises applying a plurality of different granularity values when detecting a pattern of downtime and selecting a granularity value from among the plurality of different granularity values to assign the pattern of downtime.

12. The method of claim 11, wherein the plurality of different granularity values comprise at least two of a daily value, a weekly value, a monthly value, and a quarterly value.

13. The method of claim 8, wherein the removing comprises dividing the time-series data signal into two subsets including a first subset with a fluctuating time-series signal value and a second subset with a null time-series signal value, and training the machine learning model using the first subset but not the second subset.

14. The method of claim 8, wherein the method further comprises receiving downtime inputs via a user interface and generating additional segregation instructions for removing data from the time-series data signal of a same type based on the received downtime inputs.

15. A non-transitory computer-readable medium comprising instructions which when executed by a processor cause a computer to perform a method comprising:
   detecting one or more patterns of downtime within a time-series data signal based on null values within values of time-series data corresponding to the time-series data signal;
   removing a subset of data from the time-series data based on the one or more detected patterns of downtime and building a machine learning model to make predictions based on remaining data in the time-series data;
   generating segregation instructions configured to remove downtime data from a time- series data signal of a same type, the segregation instructions including encoded computer instructions to filter downtime data from time series data based on a combination of a frequency of occurrence value of a recurring pattern of downtime and a time period value at which the recurring pattern of downtime occurs;
   building a composite machine learning model that includes the machine learning model and the segregation instructions for filtering data that is input to the machine learning model; and
   storing the composite model in memory.

16. The non-transitory computer-readable medium of claim 15, wherein the method further comprises deploying the composite model including the machine learning model and the segregation instructions within a productive environment.

17. The non-transitory computer-readable medium of claim 15, wherein the method further comprises executing the machine learning model on new a new time-series data signal and outputting a prediction based on the new time-series data signal, wherein the executing comprises automatically removing a subset of data from the new time-series data signal based on the segregation instructions prior to generating the prediction and enforcing a zero value for the subset of data in the output prediction.

18. The non-transitory computer-readable medium of claim 15, wherein the detecting comprises applying a plurality of different granularity values when detecting a recurring pattern of downtime and selecting a granularity value from among the plurality of different granularity values to assign the pattern of downtime.

\* \* \* \* \*